R. F. GOENNEL.
AUTOMOBILE BODY.
APPLICATION FILED APR. 29, 1919.
1,322,896.
Patented Nov. 25, 1919.
2 SHEETS—SHEET 2.
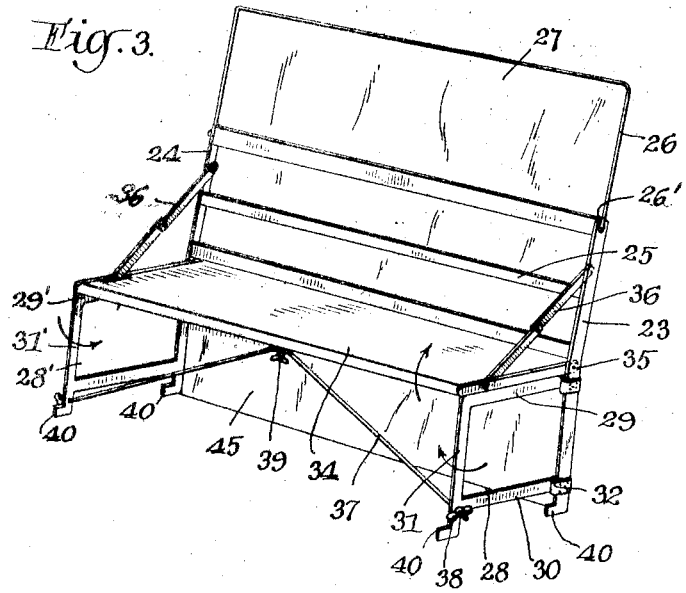
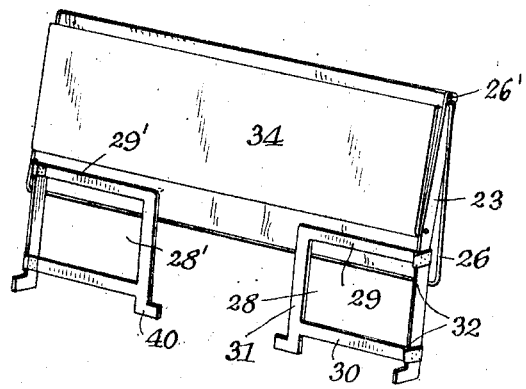
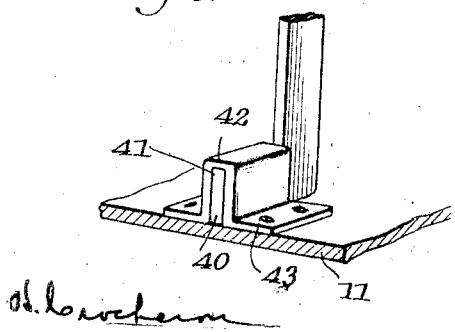
INVENTOR
Rudolph F. Goennel.

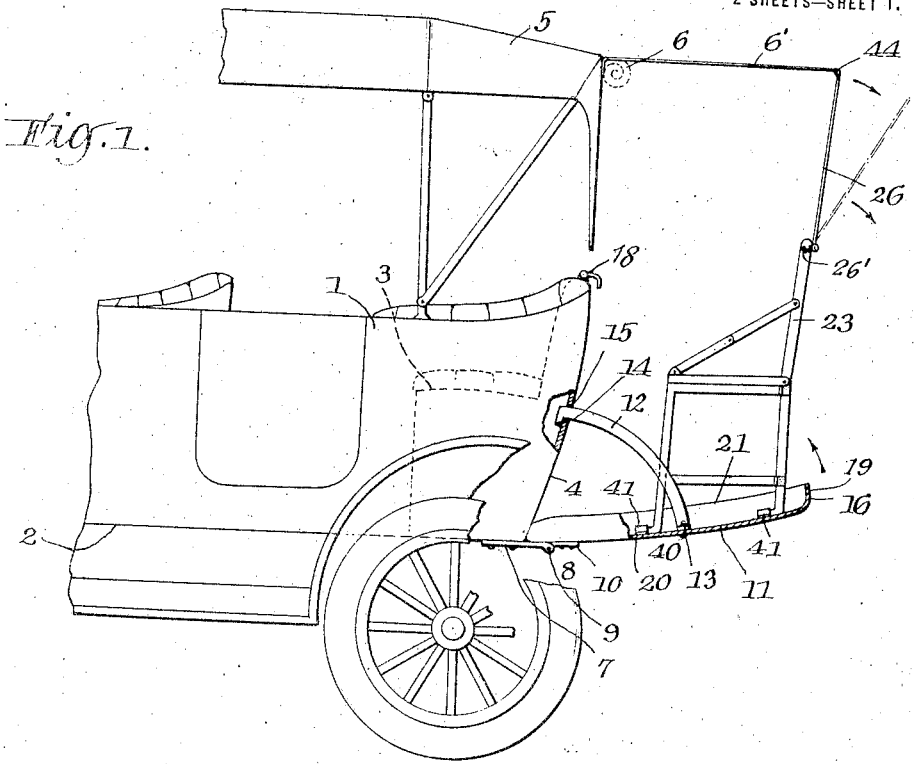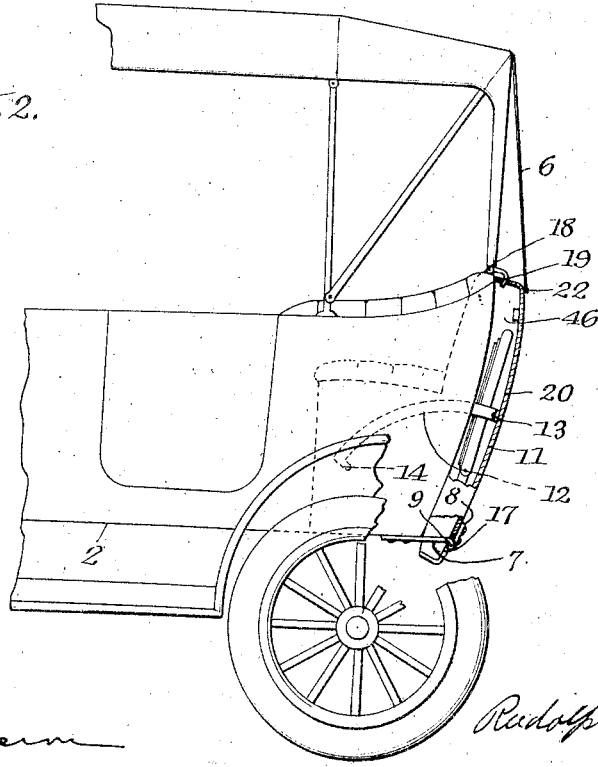

UNITED STATES PATENT OFFICE.

RUDOLPH F. GOENNEL, OF BROOKLYN, NEW YORK.

AUTOMOBILE-BODY.

1,322,896.  Specification of Letters Patent.  Patented Nov. 25, 1919.

Application filed April 29, 1919. Serial No. 293,438.

*To all whom it may concern:*

Be it known that I, RUDOLPH F. GOENNEL, a citizen of the United States, and a resident of the borough of Brooklyn, city and State of New York, have invented certain new and useful Improvements in Automobile-Bodies, of which the following is a specification.

This invention relates to vehicles, and more particularly to the bodies thereof.

One of the objects of this invention is to provide simple and practical means for increasing the carrying capacity of a vehicle body.

Another object is to provide a light, durable and inexpensive attachment for vehicles such as touring cars to render possible the carrying with comfort of passengers in addition to the number for which the vehicle is normally intended.

Another object is to provide an attachment of the above type which may be readily applied, and which may be readily disposed upon the vehicle when not needed, in inobtrusive position.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompaanying drawings wherein is shown one of various possible embodiments of the several features of this invention, Figure 1 is a fragmentary view of a vehicle with my attachment applied and shown in operative position.

Fig. 2 is a view similar to Fig. 1, with the attachment in inoperative position.

Fig. 3 is a perspective view of my combined rear attachment wall and seat.

Fig. 4 is a perspective view of Fig. 3 in collapsed condition, and

Fig. 5 is a fragmentary detail view on a larger scale, of a detachable connection for the separable parts of my extension.

Similar reference characters refer to similar parts throughout the different views of the drawings.

Referring now to these drawings, I have shown at 1, a fragmentary view of an automobile of the touring car type, including a floor 2, a back seat 3, a rear wall 4, a roof 5 and a rear curtain shown in dotted lines and in rolled up condition at 6. The specific form of automobile disclosed is intended to be merely illustrative, as my attachment is applicable to substantially any form of automobile, or other vehicle having a body generally similar to that here shown.

To the bottom of floor 2, and near the rear thereof, I preferably secure on each side, one leaf 7 of a hinge designated in its entirety by the numeral 8, said leaf 7 extending beyond the rear of the floor 2 and terminating at its extending end in a pintle 9. The other leaf of the hinge is shown at 10 and is secured to a floor extension member, or platform 11 projecting from the back of the vehicle, substantially as a continuation of the floor 2. Any appropriate means may be employed for firmly securing the floor extension 11 in position so that it may carry a substantial weight, but I prefer to employ specifically a pair of curved bracing members, one of which is shown at 12, rigidly secured by one end as at 13, to platform 11, and provided with preferably an integral downwardly extending lug 14 at the other end, said latter end preferably extending through an opening 15 in the rear wall 4, said opening being somewhat below the seat 3.

It is apparent that the platform 11 cannot be turned about the hinge to a position lower than that indicated in Fig. 1, as the bracing members 12 by the contact of lugs 14 with the inner surface of the rear wall 4, determine the limiting position.

My platform 11 is preferably provided with an upstanding rim 16, and with slots 17 in registry with leaves 7 of the hinges. Assuming the platform to be devoid of the appurtenances shown mounted thereon in Fig. 1, it is apparent that this platform may be moved about the pintle 9 of the hinge, slots 17 permitting it to clear leaves 7, curved braces 12 moving through the slot 15 to the position under seat 3 shown in dotted lines in Fig. 2. The platform is thus moved to inoperative and inobtrusive position. To maintain it in this position, a hook 18 is preferably provided near the top of the rear wall 4, adapted to coöperate with an eye 19 in that portion of the rim 16, coming into registry with the hook.

The floor extension member 11 as shown in Fig. 2 is preferably made to have substantially the same size, contour, and curvature as the rear wall 4, and the finish of the lower surface 20 of said platform is preferably the same as that of the car body. The rim 16 has its edge 21 also curved substantially in parallelism with the platform, so that said rim when the platform is moved to the position shown in Fig. 2, will merge with the body of the car.

A hook 22 is preferably provided at the rear end of the extension 11, which rear end is near the top when the platform is moved to the inoperative position shown in Fig. 2, said hook serving to retain the rear curtain 6 in drawn position, as shown in Fig. 2.

It is thus seen that when the floor extension is not needed and is moved to the inoperative position shown in Fig. 2, and especially when the curtain 6 is drawn, the presence of the extension is not readily noticeable, and the esthetic appearance of the vehicle is preserved.

My floor extension thus far described, may be used to advantage for carrying baggage or other articles. I prefer, however, to associate with such floor extension, a compartment with seats for passengers in addition to those who may be seated within the car itself. For this purpose, I prefer to employ the specific combined rear attachment wall and seat, shown in Fig. 3. This equipment preferably comprises two vertical slats 23—24, joined by a plurality of horizontal slats 25. Near the top of said vertical slats there is preferably pivoted a U-shaped frame 26, having a curtain member 27 thereon as shown in the drawings. This frame is preferably limited by any desired means as lugs 26' against turning forwardly beyond the vertical position, though free to be pivoted backwardly.

A relatively strong U shaped metal member 28 having parallel arms 29 and 30 and connecting element 31, is preferably hinged at the free ends of its arms to the vertical slat 23, as clearly shown at 32. A similar U-shaped member 28' is similarly disposed with respect to slat 24. Corresponding parts of member 28' bear the same reference numerals as those of member 28, primed.

A seat is arranged to rest upon the arms 29 and 29'. This seat is preferably hinged to the two vertical slats 23—24, as clearly shown at 35, and is further connected to said slats by toggle braces 36, which firmly hold said seat against arms 29, 29'. The toggle braces may also serve as arm-rests.

It is apparent from the drawings, that the lower portions of slats 23—24, constitute the rear legs of the attachment seat and the elements 31 and 31' constitute the front legs. To strengthen the construction, a tie rod 37 is preferably connected between the front legs, being secured at each end by a winged nut 38 and being further secured to the bottom of seat 34 at its middle by a winged screw 39.

The entire equipment shown in Fig. 3 is mounted upon the floor extension 11, as shown in Fig. 1. To make a firm connection between these elements, I preferably provide integral forwardly extending lugs 40, one at the bottom of each of the legs, adapted to be inserted in socket elements 41, appropriately mounted upon the platform 11. These sockets are preferably identical and each consists of an inverted U-shaped metallic member 42, with outwardly projecting flanges 43 firmly secured to the platform 11. The frame 26 preferably has a hook or fastener 44 at or near its top, to which the end of curtain 6 may be attached, thus converting this curtain into a roof for the extension compartment.

If desired, a fabric covering 45 may be provided upon the entire rear wall or panel of the extension compartment below frame 26, the curtain 27 on said frame when drawn thus completing the rear covering from the floor extension 11 to the roof extension 6'.

When the extension is not needed, it may readily be moved to inoperative and inobtrusive position. For this purpose, the curtain 6' is disconnected from frame 26, and may be folded backwardly to the position shown by dotted lines in Fig. 1. The combined compartment wall and seat may then readily be withdrawn from sockets 41 and collapsed as shown in Fig. 4. To accomplish this, the tie rod 37 is loosened, preferably by removing the winged nuts 38, thereupon the toggle braces 36 are collapsed folding the seat 34 upwardly against the back, and the U shaped members 28 and 28' are folded inwardly, all as shown in Fig. 1.

The collapsed compartment element may then be laid upon the floor extension 11, and this floor extension raised about hinges 8 to the position shown in Fig. 2, where it can be secured in the manner already described. The collapsed equipment shown in Fig. 4 rests snugly within the compartment 46, formed between the retracted platform and the rear wall. This compartment 46 may, of course, be used to good advantage for holding other articles.

Throughout the specification and in some of the claims, I have used the words "touring car". I employ this term to distinguish from roadsters or runabouts. I intend this term to designate generically, any car which has a seat substantially directly above the rear axle. Certain of the broader aspects of my invention, as is apparent from certain of the claims, are however applicable to vehicles generally including roadsters. It should further be noted that my invention is not confined in its applicability to motor vehicles.

It is thus seen, that I have provided an accessory equipment for increasing the carrying capacity of the vehicle body, either for materials or passengers, and that this equipment is applicable to vehicles of any conventional construction. No modification of the automobile, or other vehicle, as it comes from the manufacturer, is needed for the application of my equipment. All that need be done, is to apply the hinge 8 to the floor of the car, to cut two small openings 15 in the rear wall of the car and to attach a little hook 18 at the upper portion of the rear wall.

It will thus be seen that there is herein described apparatus in which the several features of this invention are embodied, and which apparatus in its action, attains the various objects of the invention and is well suited to meet the requirements of practical use.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having thus described my invention what I claim as new and desire to secure by Letters Patent is:

1. In apparatus of the character described, in combination, a vehicle, a body therefor, having a substantially vertical rear wall, a floor extension member hinged at its bottom adjacent the floor of said vehicle, and means near the top of said wall for securing said extension member in inoperative position to the back of and substantially parallel to said rear wall.

2. In apparatus of the character described, in combination, a touring car, a body therefor having a rear wall, a floor extension member continuous with the floor of said car and having substantially the same size, contour and curvature as said rear wall, and means for mounting said extension member in inoperative position, against the back of said rear wall in substantial parallelism therewith.

3. In apparatus of the character described, in combination, a vehicle, a platform extending substantially from the rear of the floor of said vehicle, a supplementary seat some of whose legs are provided with lugs, and sockets on said platform coöperating with said lugs, to detachably hold said seat in operative position.

4. In apparatus of the character described, in combination, a touring car having a body, a platform hinged to the bottom of said body near the rear end thereof, a collapsible and detachable seat mounted on said platform, said platform having an upstanding rim, whereby, when said platform is turned about its hinge to inoperative position adjacent the back of said body a compartment is formed between said back and said platform for lodging said seat in collapsed condition.

5. In apparatus of the character described, in combination, a touring car, a body therefor, having a rear wall, a floor extension member having a base continuous with said floor and a rim of substantial uniform width, and means for mounting said extension member in inoperative position, substantially parallel to said rear wall, with said rim against said rear wall, whereby a compartment is formed between said rear wall and said inoperative extension member.

6. In a vehicle, in combination, a floor, a roof thereover, and a substantially vertical surface connecting the rear of said floor with the rear of said roof, a displaceable floor extension member to the rear of said floor, a displaceable roof extension member to the rear of said roof, and a second substantially vertical member connecting the rear of said roof extension to the rear of said floor extension.

7. In a vehicle, in combination, a floor, a roof thereover, and a substantially vertical surface connecting the rear of said floor with the rear of said roof, a displaceable floor extension member to the rear of said floor, a supplementary seat on said extension having a back, a frame above said back, and a roof extension connecting the rear of said roof with the top of said frame.

9. In a vehicle, in combination, a floor, a roof thereover, a substantially vertical fixed rear wall, a rear curtain substantially in the plane of said rear wall, a displaceable floor extension member to the rear of said floor, a supplementary seat on said extension having a back, a frame hinged to the top of said back, and fastening means at the top of said frame for holding said curtain when the latter is extended back of the vehicle, to constitute a roof for said extension.

9. In combination, a supplementary seating compartment for vehicles, comprising a platform having substantially the same size contour and curvature as the rear wall of the vehicle to which it is to be applied, a seat member, having a back, a frame connected to the top of said back, and coöperating means on said platform and said seat for detachably securing the latter upon the former.

10. In combination, a supplementary seating compartment for vehicles, comprising a platform, a collapsible seat member, having legs and a back, a frame hinged to the top of said back, said legs having extensions at right angles thereto, and horizontally extending sockets secured to said platform for lodging said leg extensions.

11. In apparatus of the character described, in combination, a vehicle, a body therefor including a rear wall and a floor, a floor extension member to the rear of said body, a hinge having two leaves and a pintle, one of said leaves being secured to said floor, with said pintle beyond said floor, the other leaf being secured to said extension, bracing means supporting said extension from said rear wall, said extension having slots adjacent said hinge to permit it to be raised to lie against said rear wall, and means to retain said extension in retracted position.

12. In apparatus of the character described, in combination, a touring car, a body therefor having a fixed rear wall, a displaceable floor extension member to the rear of said body having substantially the same size contour and curvature as said rear wall, said extension member having fastening means adapted to hold the rear curtain of said car in drawn position when said extension is in inoperative position.

In witness whereof, I have hereunto set my hand at the borough of Manhattan, city and State of New York, this 28th day of April 1919.

RUDOLPH F. GOENNEL.

In presence of—
ZITA M. GRAHAM.